US009470350B2

(12) United States Patent
Spencer et al.

(10) Patent No.: US 9,470,350 B2
(45) Date of Patent: Oct. 18, 2016

(54) METAL-TO-COMPOSITE INTERFACES

(71) Applicant: Spencer Composites Corporation, Sacramento, CA (US)

(72) Inventors: Brian Spencer, Sacramento, CA (US); Richard Grover, Sacramento, CA (US)

(73) Assignee: Spencer Composites Corporation, Sacramento, CA (US)

( * ) Notice: Subject to any disclaimer, the term of this patent is extended or adjusted under 35 U.S.C. 154(b) by 0 days.

(21) Appl. No.: 14/338,705

(22) Filed: Jul. 23, 2014

(65) Prior Publication Data

US 2015/0027720 A1 Jan. 29, 2015

Related U.S. Application Data

(60) Provisional application No. 61/857,478, filed on Jul. 23, 2013.

(51) Int. Cl.

| | |
|---|---|
| ***E21B 7/12*** | (2006.01) |
| ***F16L 33/01*** | (2006.01) |
| ***E21B 17/08*** | (2006.01) |
| ***F16L 11/08*** | (2006.01) |

(52) U.S. Cl.

CPC .............. *F16L 33/01* (2013.01); *E21B 17/085* (2013.01); *F16L 11/08* (2013.01); *Y10T 29/49826* (2015.01)

(58) Field of Classification Search

CPC ....................................................... E21B 17/01
USPC ........................................... 166/367; 285/238
See application file for complete search history.

(56) References Cited

U.S. PATENT DOCUMENTS 5,994,124 A 11/1999 Bozzoni
6,042,152 A 3/2000 Baldwin et al.
6,050,612 A 4/2000 Wolterman
6,072,252 A 6/2000 Van Dine et al.
6,536,480 B2 * 3/2003 Guesnon ................ F16L 13/04 138/155
6,719,058 B2 4/2004 Salama et al.
7,662,251 B2 2/2010 Salama et al.
8,001,996 B2 * 8/2011 Paulshus ................ E21B 17/01 138/109
8,733,446 B2 * 5/2014 Espinasse ............. E21B 17/012 166/344
8,997,877 B2 * 4/2015 Waldron ............. B21K 25/005 166/360
9,097,366 B2 * 8/2015 Poirette ................... F16L 13/02
2005/0067037 A1 * 3/2005 Salama ................... E21B 17/01 138/143
2014/0041878 A1 * 2/2014 Hatton .................. E21B 17/012 166/350

OTHER PUBLICATIONS

Spencer, Application of the Filament Winding Process, Advanced Composites: The Latest Developments Proceedings of the Second Conference on Advanced Composites, Nov. 18-20, 1986, pp. 107-116, ASM.
Spencer, The Design and Application of High Performance Filament-Wound Composites, OMAE Symposium, Mar. 2, 1987, pp. 1-6.
Spencer, Composite End Fitting Designs, unknown date, pp. 1-3.
Murray, Composite Core-Sample Holder Improves X-Ray Sensitivity, Design News, May 23, 1988.

* cited by examiner

*Primary Examiner* — Matthew R Buck
*Assistant Examiner* — Aaron Lembo
(74) *Attorney, Agent, or Firm* — McGlew and Tuttle, P.C.

(57) ABSTRACT

The invention relates to improved metal/composite interfaces, particularly for risers used in offshore oil and gas production to connect a subsea oil well to a surface drilling/production facility. The invention provides a composite hoop structure configured to a bearing surface of a metal groove of metal liner over which axial fibers are laid. The composite hoop structure provides for improved transition of axial, torsional and compressive forces between composite fibers and metal surfaces of the metal liner.

18 Claims, 11 Drawing Sheets x
74a
74b
80a
74c
80c
50
80
80
80
80b

METAL-TO-COMPOSITE INTERFACES

CROSS REFERENCE TO RELATED APPLICATIONS

This application claims the benefits of priority under 35 U.S.C. §119 and 120 of U.S. Provisional Patent Application No. 61/857,478 filed Jul. 23, 2013, the entire contents of which are incorporated by reference.

FIELD OF THE INVENTION

The invention relates to improved metal/composite interfaces, particularly for risers used in offshore oil and gas production to connect a subsea oil well to a surface drilling/production facility.

BACKGROUND OF THE INVENTION

In the oil and gas industry, risers are a well known and widely used piece of equipment for offshore drilling and production. Risers are generally described as individual conduits that can be axially interconnected to provide a continuous conduit between a subsea oil well to a surface drilling/production facility.

Risers are used in both the drilling phases of an offshore drilling well as well as the production phase. During drilling, interconnected risers are used to surround a drilling string as the drilling string moves up and down and rotates during the downholedrilling and upholetripping phases. As such, the riser provides a means of encasing and protecting the drill string as well as to also contain circulating drilling fluid across the distance between the seafloor and surface drilling rig. During production, a riser will primarily serve as the conduit between the well and the on-surface production vessel. Risers may also provide a primary structural interconnection between the drilling platform on the sea surface and the ocean floor.

As such, risers are engineered to withstand the various loads required by the foregoing functions. That is, a riser must withstand substantial internal pressures from the internal pressure of drilling or production fluids being pumped within the drill string and within the riser. Risers must also withstand axial tension loads from the interconnected weight of a string of assembled risers that are being moved into and out of position prior to and after drilling. In addition, risers must also withstand axial compressive and bending loads that are imparted to a string of risers during use as a drilling rig moves with respect to the ocean floor. FIG. 1 shows the general construction of an offshore drilling rig (described in greater below).

Increasingly, offshore drilling rigs are also being operated in deeper water than in the past, and as a result, the length of riser strings are similarly increasing. Accordingly, the above described loading forces on the risers are also increasing with the need for risers to withstand greater loads.

As offshore drilling rigs were initially developed, first generation risers were manufactured as unitary steel structures and simply comprised a hollow steel tube having an outer wall and with appropriate threaded or flanged connectors at either end to enable interconnection of individual risers. The main problems with steel risers included the relative weight of individual risers for the required loading such that as the loading on the risers increased, they became progressively more unwieldy in terms of weight. That is, with increasing weight, there were associated costs and complexities of handling large and heavy tubes particularly in an offshore environment. As a result, later generation composite risers have been developed and have been in use for many years.

In the typical composite riser design, the riser includes a relatively thin internal steel liner surrounded by an outer composite jacket. At either end of the riser, industry standard steel fittings are continuous with and/or are connected to the thin steel liner to enable adjacent risers to be connected to one another. As such, the internal steel portion of the riser includes a relatively thin central portion that either tapers towards or is connected to a thicker end portion that comprises the connectors. Similarly, the composite outer jacket has a thicker central portion that surrounds the thin central steel portion that tapers to a thinner end portion that is engaged with the connector portions.

The junction between the steel and composite material is engineered to ensure that the structural loads between the steel and composite materials are effectively transmitted between the two materials over time. More specifically, as a result of differences in the stiffness of steel and composite structures, the forces are transmitted over a smaller area as compared to materials that may have similar stiffnesses. This mismatch in stiffnesses can be addressed by effectively increasing the areas of contact between the two materials. As shown in FIG. 2 and as described in U.S. Pat. No. 6,719,058 (incorporated herein by reference) a typical metal/composite interface (MCI) is shown and is often referred to as "traplock" design. In this design, the tapering metal end is provided with one or more integral rings or grooves transverse to the longitudinal liner axis (i.e. in a sagittal plane). When the internal steel components are wrapped with composite material, which may include a combination of axial, transverse and angled resin-impregnated fibers, the axial forces (compressive and tensile) are more effectively transferred across the interface.

More specifically, axially oriented reinforcing fiber is held in the trap by circumferentially wound fiber. The tapered interface of the metal/composite fitting transfers load through bearing pressure. The load is distributed from the metal/composite interface to the axial fibers by shear. Generally, a high hoop stiffness and strength is needed in the area behind the metal/composite interface to prevent the axial fibers from being pulled out of the laminate or the composite from expanding and sliding over the top of the tapered interface.

While the foregoing has been an effective design, there remain limits regarding the ultimate strength of such systems. For example, as shown in FIG. 2, finite element analysis of a typical junction reveals that there remain significant stress points at particular positions on the grooves as the axial compressive or tensile loads increase.

As a result, there has been a need for improved metal/composite interfaces particularly for risers.

SUMMARY OF THE INVENTION

In accordance with the invention, there is provided a composite riser having a metal/composite interface comprising: a tubular metal liner having at least one tubular metal end connected to the tubular metal liner, the tubular metal end having at least one external groove having at least one bearing surface, and a base surface; a composite hoop structure within the at least one external groove and configured against the at least one bearing surface; and a plurality of axial fibers laid over the composite hoop structure and the base surface, the axial fibers secured by at least one layer of hoop fibers wound over the axial fibers within the external groove.

In one embodiment, multiple layers of alternating axial and helical fiber layers, axial and hoop fiber layers or combinations of axial and helical and hoop fiber layers are set over the composite hoop structure.

In one embodiment, the at least one external groove has a volume defined by the bearing surface, the base surface, an outer surface and a wall surface and wherein the composite hoop structure fills 10-25% of the volume or 10-15% of the volume.

In one embodiment, the tubular metal end comprises at least three grooves and each groove has a composite hoop structure.

In another embodiment, the composite hoop structure is wound to include outer transition surfaces having a rounded surface.

In yet another embodiment, a first layer of axial fibers is laid over the composite hoop structure and the base surface of a groove.

In one embodiment, a groove includes a wall surface and the ends of the axial fibers extend against the wall surface.

In another aspect, the invention provides a method of manufacturing a composite riser having a tubular metal liner having at least one tubular metal end connected to the tubular metal liner, the tubular metal end having at least one external groove having at least one bearing surface, and a base surface comprising the steps of: a) winding a composite hoop structure against a bearing surface and base surface of each external groove; b) laying axial fibers over the composite hoop structure and within a first external groove; c) securing the axial fibers against the composite hoop structure and within the first external groove by winding at least one layer of hoop or helical fibers over the axial fibers; and d) repeating steps b) and c) for each groove of the tubular metal end.

BRIEF DESCRIPTION OF THE DRAWINGS

The invention is described with reference to the accompanying figures in which.

DETAILED DESCRIPTION OF THE INVENTION

With reference to the figures, an improved metal/composite interface is described.

Figure 1:
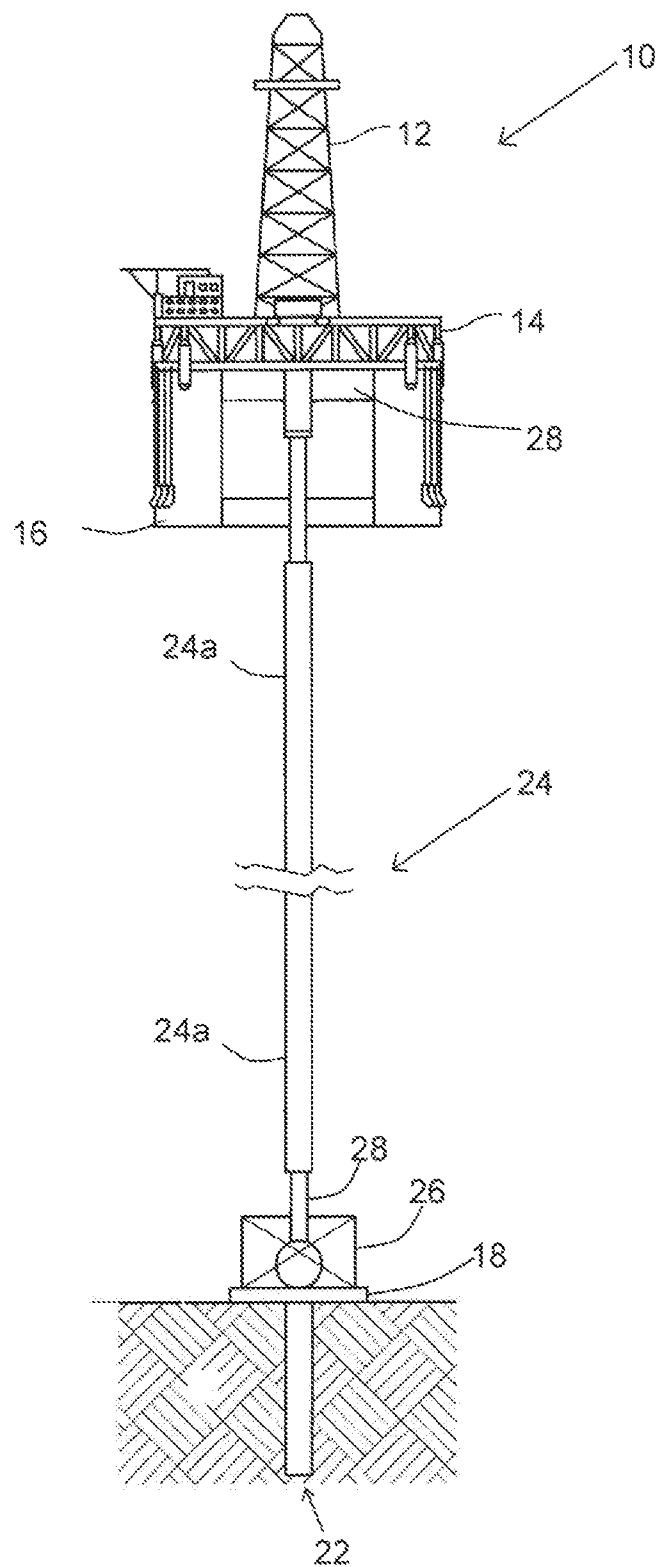
FIG. 1 is a schematic diagram of an offshore drilling and production rig in accordance with the prior art.

FIG. 1 is a schematic diagram of a conventional offshore drilling and production assembly 10 that illustrates the context of the present invention. An offshore platform 10 supports derrick 12 which is a conventional apparatus for drilling or working over a borehole and producing hydrocarbons from the borehole. Offshore platform 14 is supported by pontoons 16. A subsea platform 18 is provided on the seafloor 20 and a borehole 22 extends downward from the seafloor 20.

A string 24 of risers 24*a* extends between borehole 22 and platform 14. The riser string 24 includes a tieback connector 26 proximate borehole 22 and flex or taper joints 28 and telescoping section 30. Flex joints 28 and telescoping joint 30 accommodate the movement of platform 14 relative to the subsea platform 18 and borehole 22. The elongated riser sections 24*a* are coaxially secured to one another. Each riser section 44*a* must accommodate the pressure of the fluid or gas within the section, as well as the tensile load which is caused by the suspension of additional riser sections 24*a* below the section, the tensioner load and the bending moments imposed by the relative movement of the platform 14 with respect to the subsea platform 18.

Figure 2:
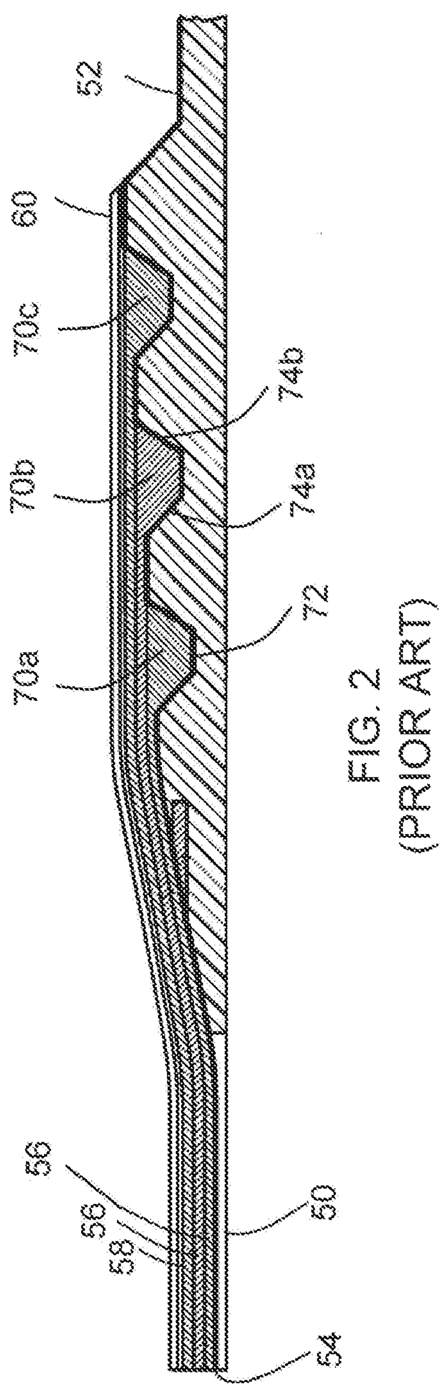
FIG. 2 is a representative example of metal/composite interface in accordance with the prior art.

As shown in FIG. 2, a typical traplock design within a composite riser is shown. In a composite riser, a metal liner 50 having metal connectors 52 form a liner assembly which is subsequently and sequentially wrapped or covered with a plurality of fiber layers typically including an elastomeric shear ply 54, composite layers 56, an external elastomeric jacket 58 and an outerwrap 60. The composite layers generally consist of small diameter fibers (6 to 10 microns) of high strength and modulus embedded in a polymer matrix material, e.g., resins or glues. The resin materials have bonded interfaces which capture the desirable characteristics of both the fibers and the matrix. The fibers carry the main load in the composite material while the matrix maintains the fibers in the preferred orientation. The matrix also acts to transfer load into the fibers and protects the fibers from the surrounding environment. The composite material properties depend upon the two major components, the fibers and the polymeric matrix. Preferably, thermoset or thermoplastic polymeric resins are used for the matrices including vinylesters and epoxies. A preferred fiber is a low cost, medium modulus (33 msi or 44 msi) polyacrylonitrile (PAN) carbon fiber. In addition, a hybrid of glass and carbon fibers incorporated in the matrix is acceptable. The fibers can also include glass fibers such as E-glass fibers.

As shown in FIG. 2, each metal connector 52 includes a number of traps that enable the effective transfer of shear, bending, compressive and axial loads between the metal connectors and the composite fibers and matrix. A typical metal connector will include at least three generally symmetrical grooves 70*a*, 70*b*, 70*c* (also referred to herein as "traplocks") around the metal connector adjacent the metal end of the connector. As shown, the diameter of each groove may be different where the smallest diameter groove 70*a* is adjacent the central section of the riser and the largest diameter groove 70*c* is adjacent the metal end of the riser. Each groove includes a generally flat inner surface 72 and two outwardly tapering flat sides 74*a* (medial side; towards middle of riser), 74*b* (lateral side; towards end of riser). The angles and dimensions of the sides of each traplock are designed in accordance with the specific performance requirements of the riser as known to those skilled in the art. In a typical design, the traplock may be 1-1.5 inches wide and 0.25-0.5 inches deep. Chamfers and/or fillets at surface junctions will be preferably included to avoid sharp transitions between the different surfaces.

Generally, the composite layers are a combination of axially oriented fibers, hoop wound fibers and axially wound fibers.

Figure 3:
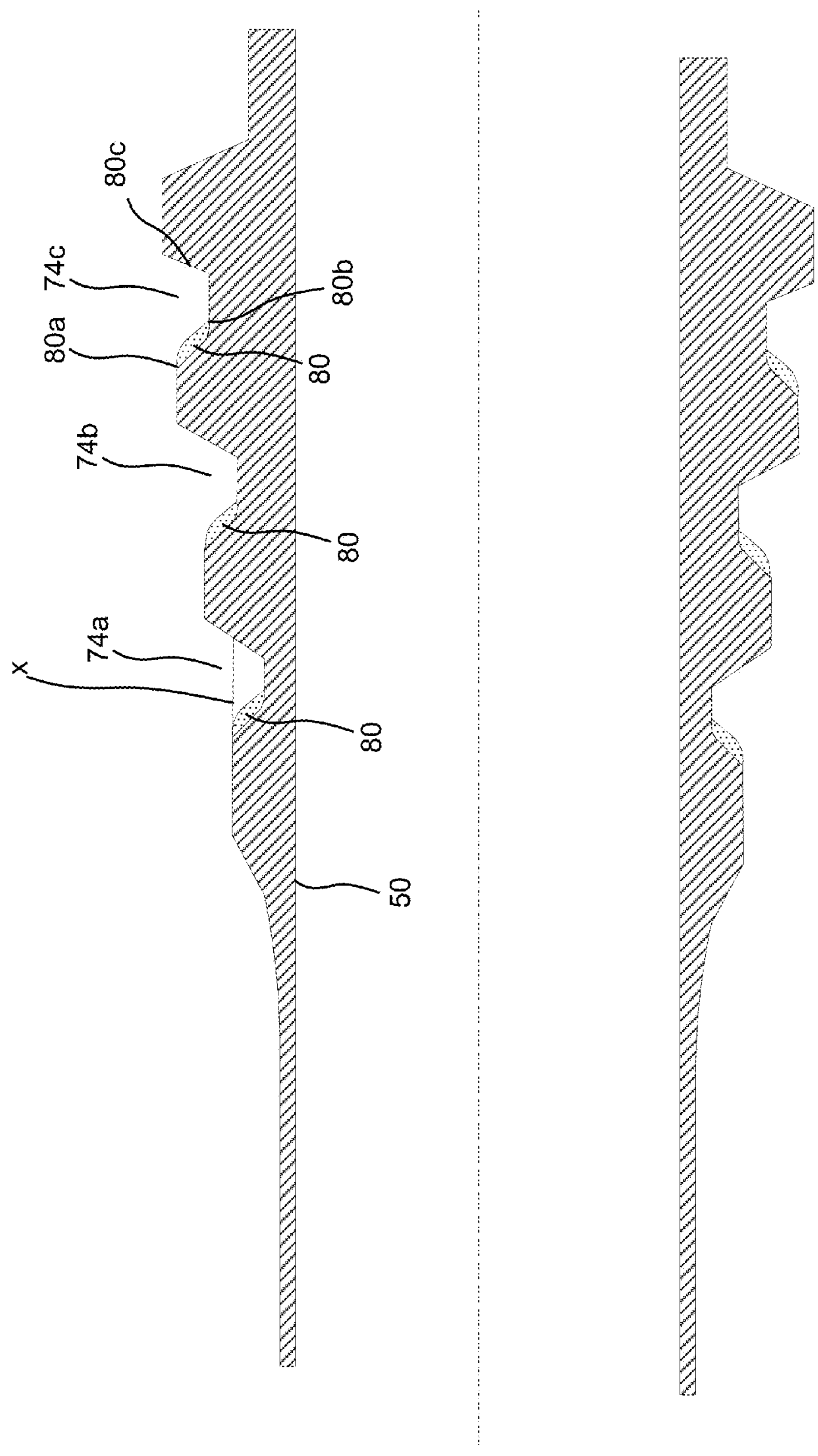
FIG. 3 is a schematic diagram of an MCI in accordance with one embodiment of the invention showing a hoop insert in each traplock.

As shown in FIG. 3, an improved MCI in accordance with the invention is described. As described herein, it has been determined that a "hoop insert" 80 forming a component of the trap lock against the liner assembly can significantly improve the strength of the riser particularly under axial load. In addition, the positioning and placement of axial fibers within the trap lock can also significantly improve the strength of the riser.

A hoop insert 80 is a ring of composite fiber and matrix abutting the medial surface 74*a* and flat surface 72 of each traplock 70*a,b,c*. The hoop insert is generally wound to fill approximately 10-15% of the volume of the traplock as calculated by outer dimension x shown in FIG. 3. The hoop insert may fill upwards of about 25% of the volume of the traplock in some designs. More specifically, the hoop insert is formed from fiber wound circumferentially against the medial surface and flat surface from resin-impregnated fiber strands. It is preferred that each hoop insert includes transition surfaces 80*a*, 80*b* that provide smooth transitions between adjacent uncovered surfaces.

Importantly, as discussed in greater detail below, the hoop insert provides an effective transition between the metal liner assembly 50 and the longitudinal fibers where the hoop insert distributes the effect of the relative difference in stiffness of the metal liner and the fiber layers across a greater volume. As such, the various loads (torsion, bending, axial and compression) that may be applied to the riser are transferred more evenly around the metal/composite interfaces which significantly improves the strength of a riser for a particular design of inner liner.

After winding, the axial, helical and hoop layers are applied over the hoop insert. The hoop insert may be cured prior to the application of axial, helical and hoop layers if there are manufacturing advantages to doing this.

Figure 4:
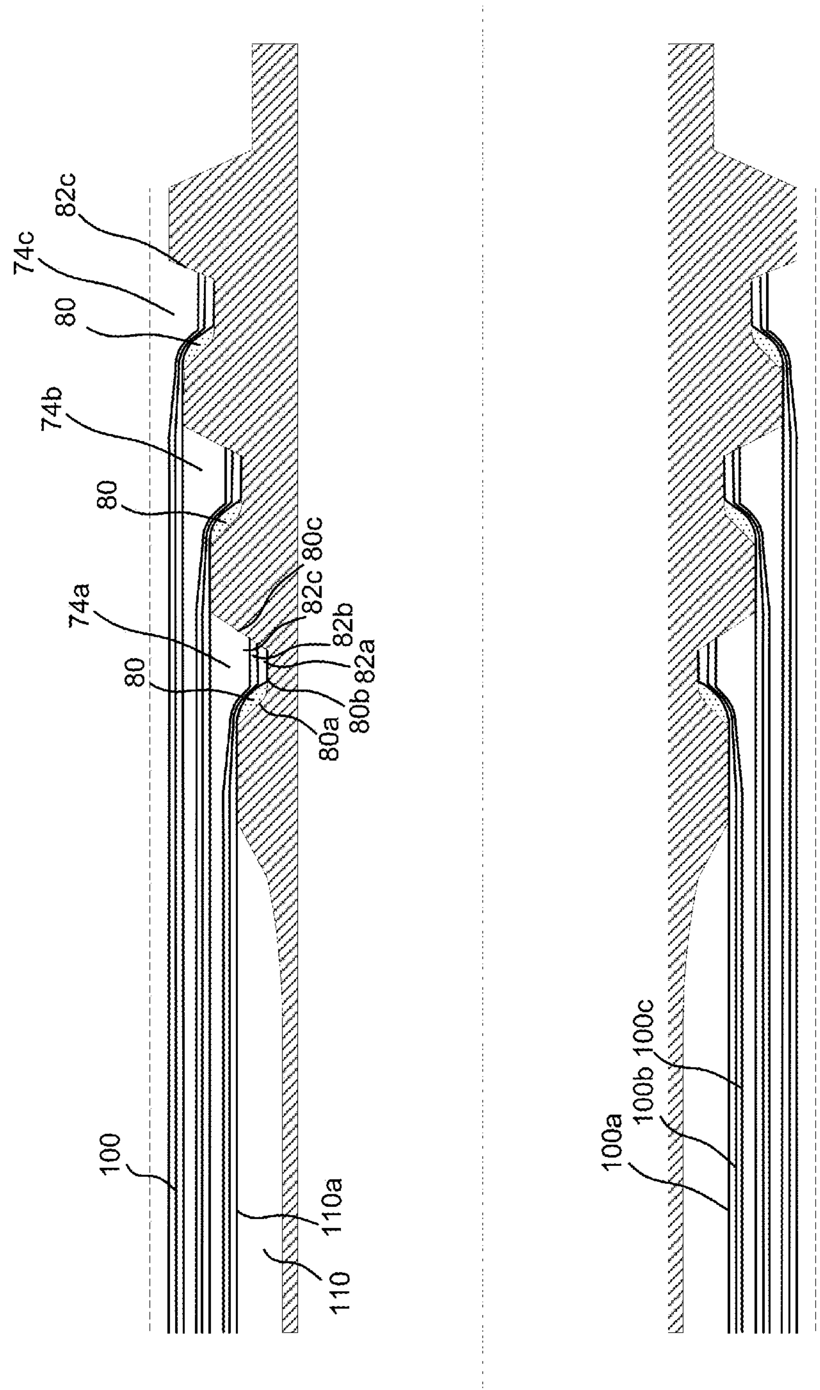
FIG. 4 is a schematic diagram showing the layout of hoop wound and axial fibers against a hoop insert in accordance with one embodiment of the invention.

As shown in FIG. 4, the placement, position and orientation of the fiber layers in accordance with one embodiment is described. As shown, each traplock includes a hoop insert set against the medial surface 80*a* of the traplock.

During assembly, each of the axial, helical and hoop layers will be sequentially laid around the liner assembly in a sequence that provides support for underlying layers and that optimizes the performance characteristics of the riser for a particular design.

For the purposes of clarity, FIG. 4 principally shows the position of the axial fibers 100 relative to the traplocks and metal liner assembly. As shown, a plurality of layers of axially oriented fibers 100*a*, 100*b*, 100*c* are laid into and secured within each traplock. For example, within first traplock 74*a*, a first layer of axial fiber 100*a* is positioned within the traplock. As shown, the first axial fiber layer 100*a* is laid against flat surface 80*a* over the hoop insert 80 and extending to wall surface 80*c* of the traplock. When positioned, the first axial layer 100*a* is secured to the metal liner assembly by hoop wound fiber 82*a* (shown as white space) wound over top of the axial fiber layer 100*a* thus securing that axial fiber layer 100*a* within the traplock. It should be noted that the medial portion of the axial fiber 100*a* is also supported by hoop or helically wound fiber.

Thereafter, successive layers of hoop wound fiber 82*b*, 110*a* are added to the riser to support a further layer of axial fiber 100*b*. As with the first axial layer, the second axial layer is laid over top of the hoop insert 80 and extends in an orientation generally parallel to the flat surface 80*b* to the wall surface 80*c*. The process is repeated such that a desired number of axial (eg. layer 100*c* and so on) and hoop and/or helically wound fiber layers are built up for each traplock.

As shown, it is generally preferred that each layer of axial fibers are separated from one another by hoop or helically wound layers as each axial fiber layer transitions away from the trap lock. That is, the axial fiber layers will generally be in close contact with adjacent axial fiber layers over the hoop insert 80 but be separated from one another towards the medial section of the riser. This separation of fibers away from the trap lock also assists in the transitioning or distribution of forces between the fibers that have different orientations.

Figure 4A:
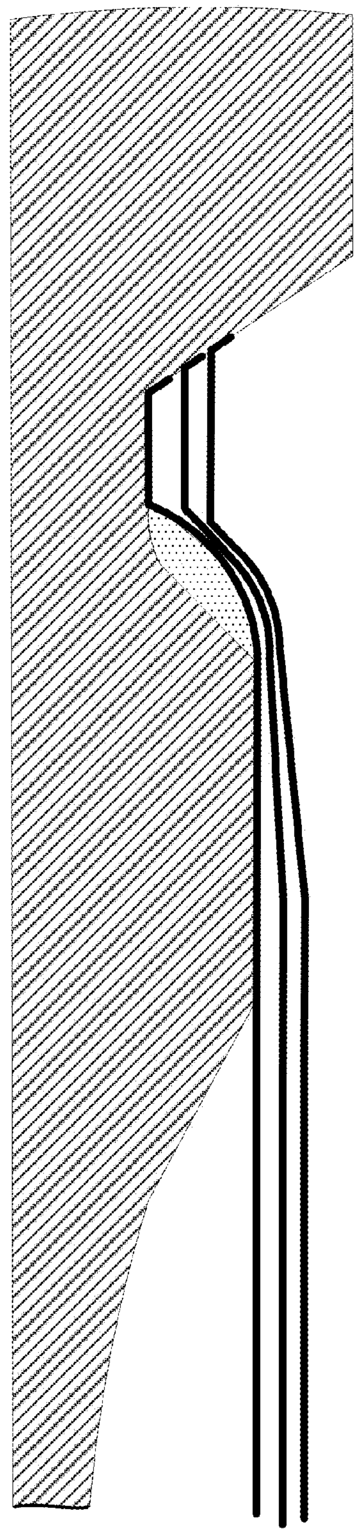
FIG. 4A is a schematic diagram showing the layout of axial fibers in accordance with one embodiment of the invention.

In an alternate embodiment as shown in FIG. 4A, the ends of an axial fiber layer 100*a*, 100*b* and 100*c* may also extend up wall surface 80*c* as shown in traplock 74*c*.

Testing Results and Discussion

Table 1 compares a finite element analysis (FEA) of the axial load level for a riser design with and without a hoop insert with axial load level at 15.7 ksi shear stress (=3% of shear strain). FIGS. 5A-7B also show an FEA study of the designs with and without a hoop insert.

TABLE 1

| | In axial fibers | In hoop insert |
|---|---|---|
| No hoop insert - | 1 275 kips | |
| Hoop insert with 34 msi fibers only | 2 800 kips | 1400 kips |

As shown in Table 1, in the case of the riser having a hoop insert, the shear stress in the hoop insert reaches 15.7 ksi (110 MPa) shear stress a tan axial load of about 2800 kips. In the case with no hoop insert, the shear stress reaches 15.7 ksi already at only 1275 kips. The significant improvement in axial load capacity has been proven by testing.

It is believed that high shear stresses in the hoop insert will not immediately lead to a delamination and an axial load failure as high shear stresses in the axial fibers are more critical. With hoop inserts the axial fibers reach 15.7 ksi (110 MPa) shear at an axial load of more than 2800 kips. The shear stress in the hoop insert at this load level is around 33 ksi (230 MPa). The compression load in the hoop insert at 2800 kips is at the most 90 ksi (620 MPa). This is a high value, however, taking 3-D effects into account, the insert has been proven to be able to take such a highloading. This is currently evaluated applying the so-called Puck failure criteria. It is noted however, that to predict the exact load capacity is very difficult from a FE analysis alone.

FIGS. 5A, 5B, 6A, 6B, 7A and 7B show the results of FEA studies of an MCI design with and without a hoop insert.

Figure 5A:
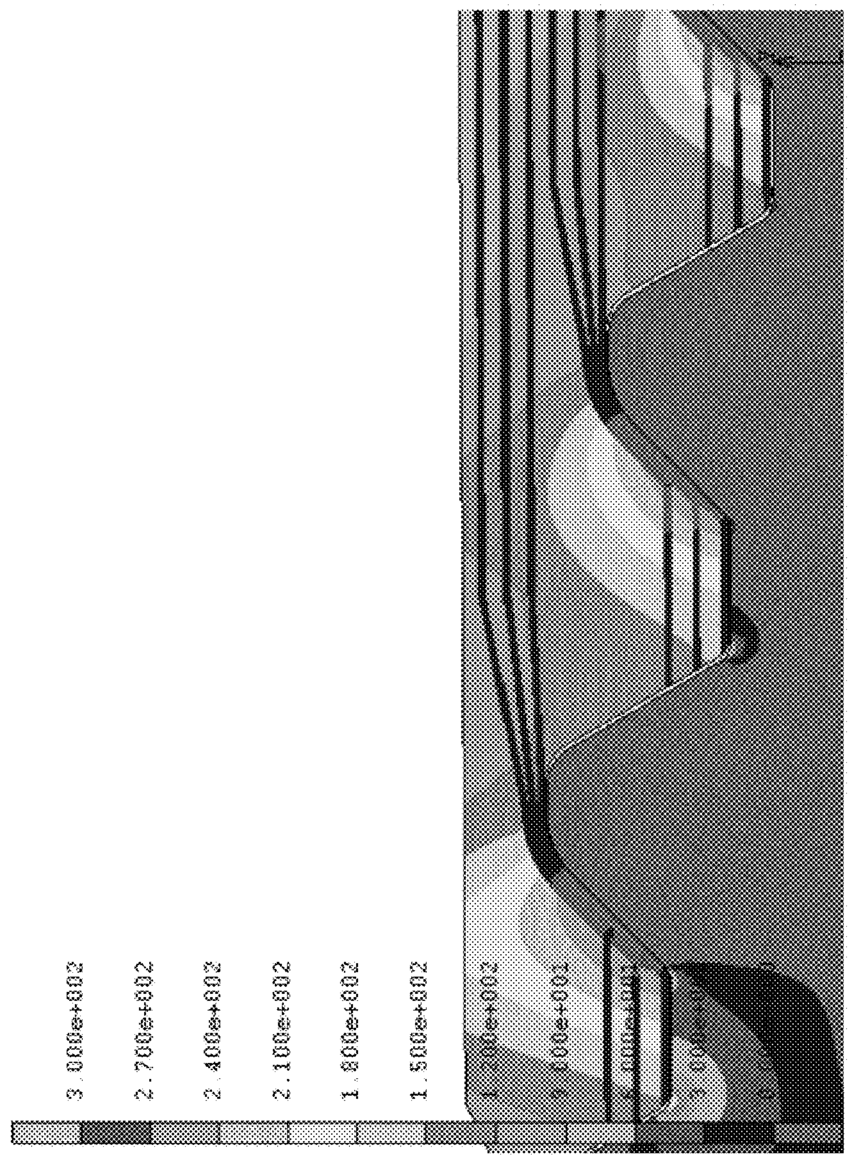
FIGS. 5A and 5B are plots showing the hoop stress of a finite element analysis (FEA) study for an MCI in accordance with the prior art (5A) (no hoop insert) and in accordance with the invention (5B) (with hoop insert) for a 1250 kips axial load.
Figure 5B:
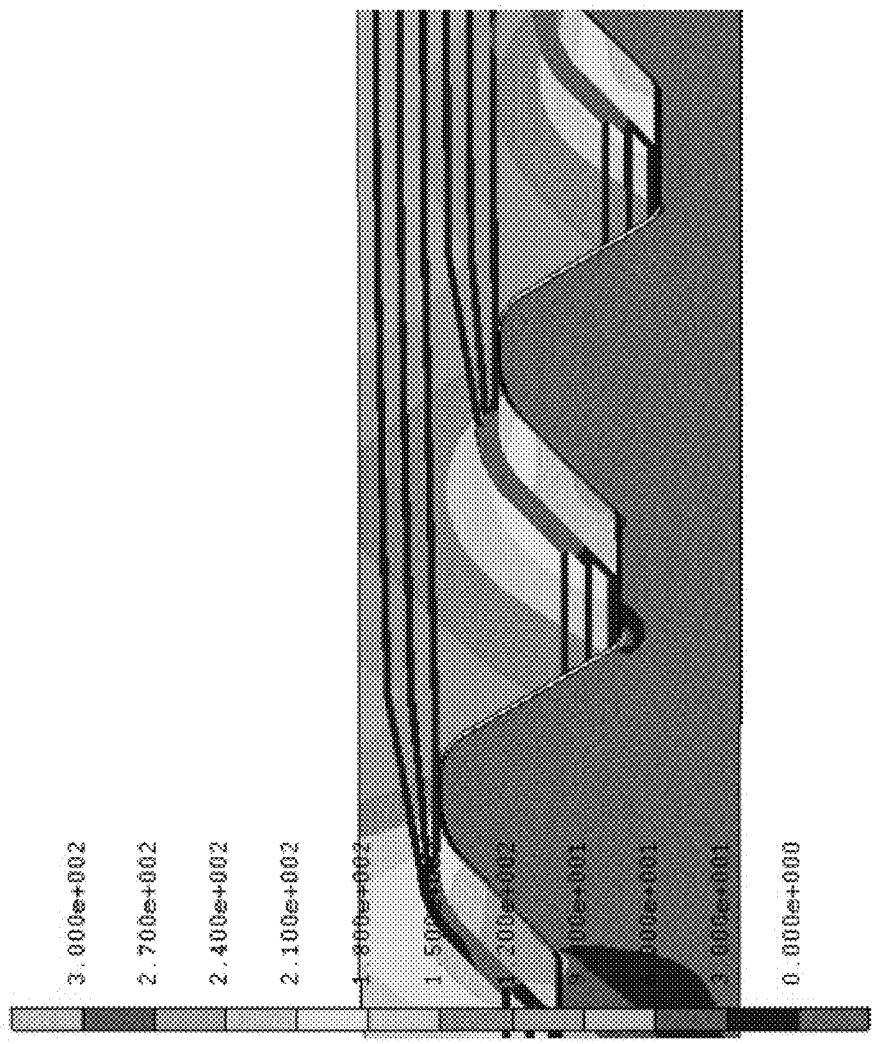
Figure 6A:
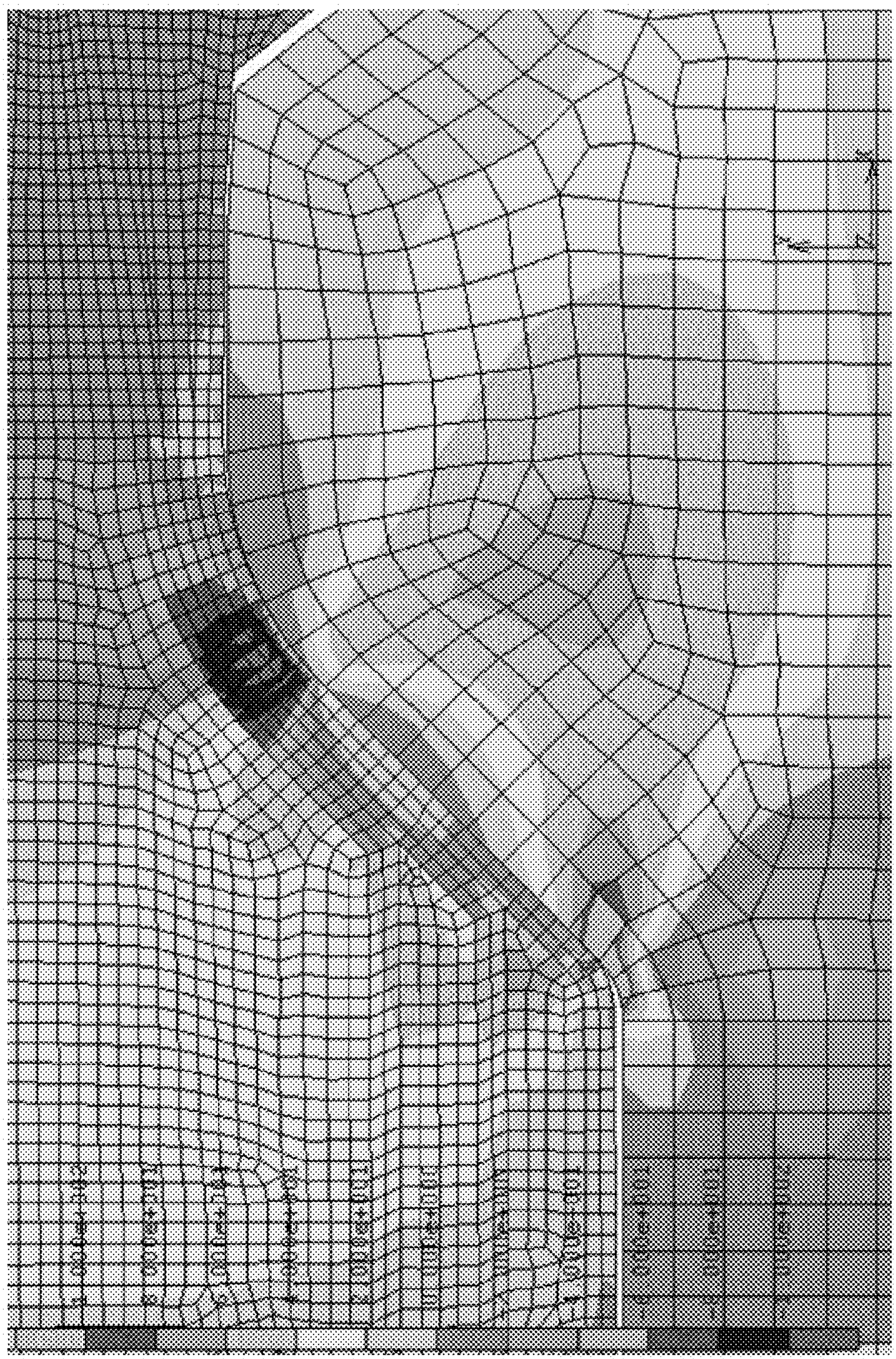
FIGS. 6A and 6B are plots showing the hoop stress of a finite element analysis (FEA) study for an MCI in accordance with the prior art (6A) (no hoop insert) and in accordance with the invention (6B) (with hoop insert) for a 1250 kips compression load.
Figure 6B:
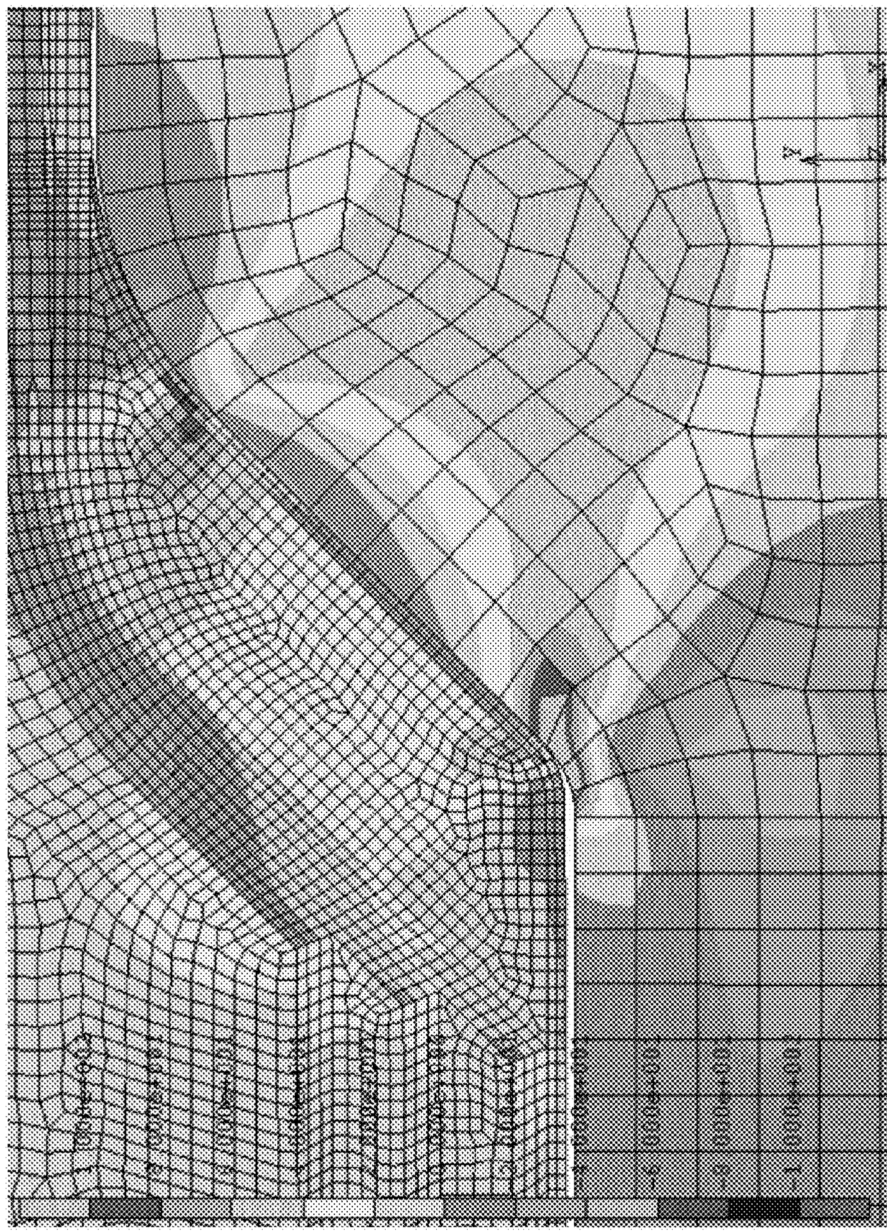
Figure 7A:
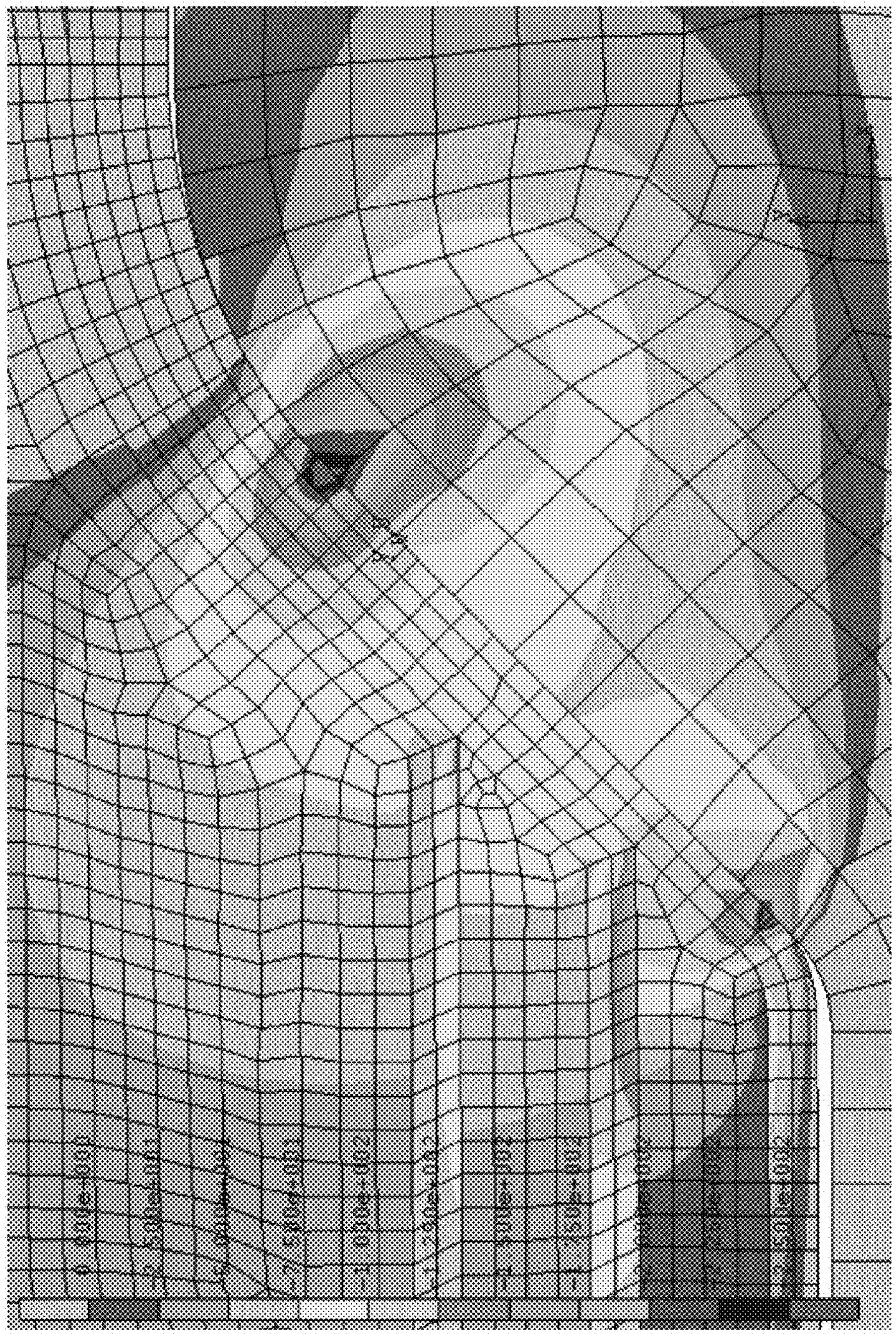
FIGS. 7A and 7B are plots showing the hoop stress of a finite element analysis (FEA) study for an MCI in accordance with the prior art (7A) (no hoop insert) and in accordance with the invention (7B) (with hoop insert) for a 1250 kips shear load.
Figure 7B:
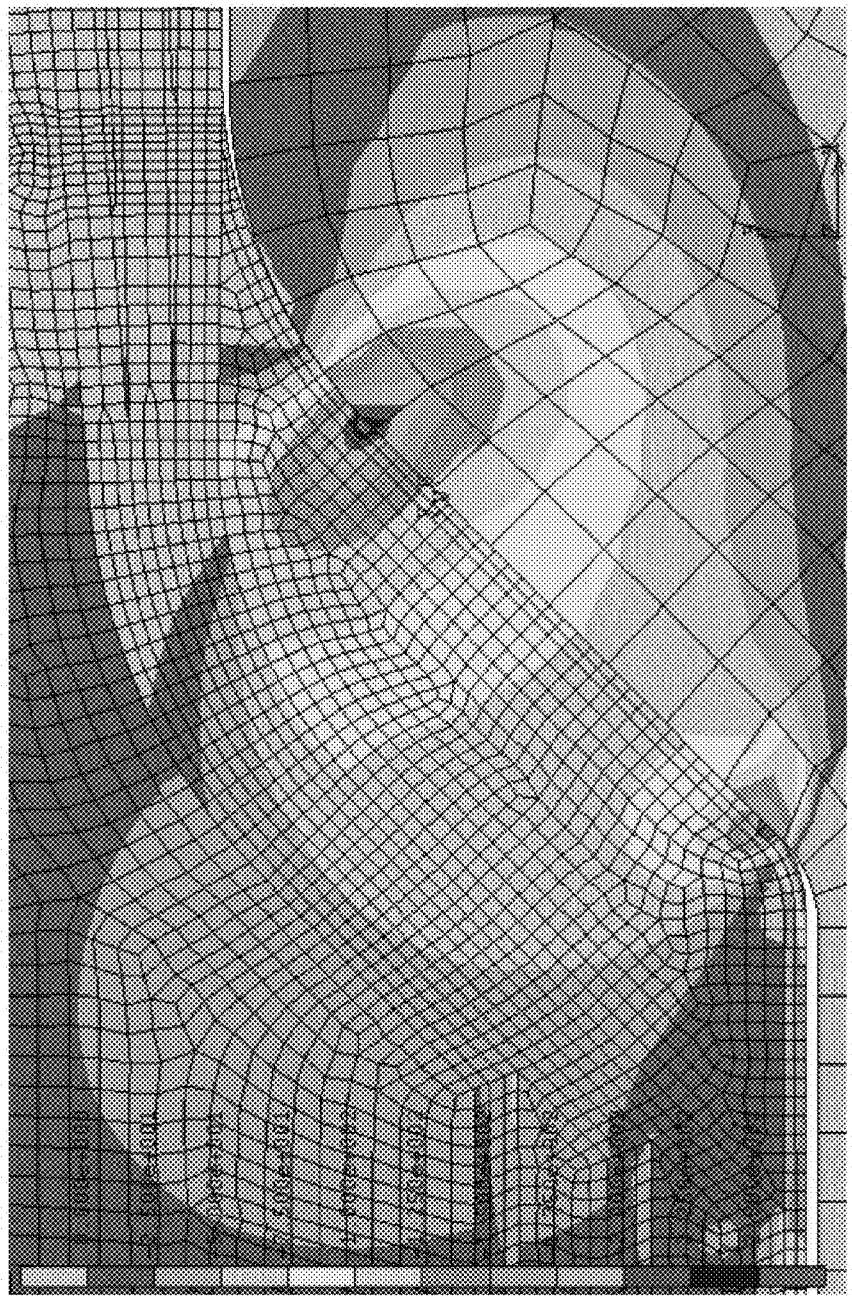

As shown in FIGS. 5A (no hoop insert) and 5B (with hoop insert), with simulated 1250 kips axial load, the hoop insert shows lower stress development around each trap lock. FIGS. 6A and 6B show a similar result under compression and FIGS. 7A and 7B show a similar result under shear.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A composite riser having a metal/composite interface comprising:
- a tubular metal liner comprising at least one tubular metal end connected to the tubular metal liner, the tubular metal end having at least one external groove having a bearing surface, and a base surface;
- a composite hoop structure within the at least one external groove and formed from hoop fibers wound circumferentially around the at least one tubular metal end, the composite hoop structure configured against the bearing surface and a medial side of the base surface, leaving a distal side of the base surface uncovered by the composite hoop structure; and
- a plurality of layers of axial fibers laid over the composite hoop structure and the distal side of the base surface, the plurality of layers of axial fibers being oriented generally parallel to a longitudinal axis of the tubular metal liner; and
- a plurality of layers of hoop and/or helically wound fibers wound over the axial fibers within the at least one external groove, wherein one of the layers of the hoop and/or helically wound fibers is positioned between each adjacent layer of axial fibers for supporting and/or securing the layers of axial fibers.

2. The composite riser as in claim 1, wherein the at least one external groove has a volume defined by the bearing surface, the base surface, an outer surface and a wall surface and wherein the composite hoop structure fills 10-25% of the volume.

3. The composite riser as in claim 2, wherein the composite hoop structure fills 10-15% of the volume.

4. The composite riser as in claim 1, wherein the tubular metal end comprises at a plurality of external grooves each having a bearing surface and a base surface, wherein each one of the external grooves contains a composite hoop structure, wherein alternating layers of the axial fibers and the hoop and/or helically wound fibers are laid within each one of said external grooves.

5. The composite riser as in claim 1, wherein the composite hoop structure is wound to include outer transition surfaces having rounded surfaces.

6. The composite riser as in claim 1, wherein the plurality of layers of axial fibers and hoop and/or helically wound fibers extend along a medial section of the composite riser, and the plurality of layers of hoop and/or helically wound fibers are thinner over the composite hoop structure than in the medial section of the composite riser.

7. The composite riser as in claim 1, wherein the at least one external groove includes a wall surface adjacent the distal side of the base surface, and the plurality of layers of axial fibers extend along at least a portion of the wall surface substantially parallel with the wall surface.

8. The composite riser as in claim 1, wherein the composite hoop structure is contained within the at least one external groove.

9. A method of manufacturing a composite riser having a tubular metal liner having at least one tubular metal end connected to the tubular metal liner, the tubular metal end having at least one external groove having a bearing surface, and a base surface, the method comprising the steps of:

a) winding a composite hoop structure circumferentially around the at least one tubular metal end within the at least one external groove against the bearing surface and a medial side of the base surface, leaving a distal side of the base surface uncovered by the composite hoop structure;

b) laying a layer of axial fibers over the composite hoop structure and the distal side of the base surface, the layer of axial fibers being oriented generally parallel to a longitudinal axis of the tubular metal liner;

c) securing the layer of axial fibers against the composite hoop structure and within the at least one external groove by winding a layer of hoop and/or helically oriented fibers over the layer of axial fibers;

d) laying a second layer of axial fibers over the layer of hoop and/or helically oriented fibers; and e) winding a second layer of hoop and/or helically oriented fibers over the second layer of axial fibers.

10. The method of claim 9, wherein the tubular metal end has a plurality of external grooves and in step a), a composite hoop structure is wound within each external groove, and steps b) to e) are repeated for each external groove.

11. The method as in claim 9, wherein the at least one external groove includes a wall surface adjacent to the distal side of the base surface, and the layers of axial fibers extend along at least a portion of the wall surface substantially parallel with the wall surface.

12. The method as in claim 9, wherein steps d) and e) are repeated to include additional alternating layers of axial fibers and hoop and/or helically oriented fibers.

13. A composite riser having a metal/composite interface comprising:
- a tubular metal liner comprising at least one tubular metal end connected to the tubular metal liner, the tubular metal end having an outer surface defining at least one external groove;
- a composite hoop structure arranged in only a portion of said at least one external groove, said composite hoop structure comprising an outer surface and hoop fibers wound circumferentially around the at least one tubular metal end;
- a first fiber structure engaging said outer surface of the composite hoop structure, at least a portion of said fiber structure being fixed in said at least one external groove, the first fiber structure comprising an outer surface; and
- a second fiber structure engaging the outer surface of the first fiber structure, each of said first fiber structure and the second fiber structure comprising a layer of axial fibers oriented substantially parallel to a longitudinal axis of the tubular metal liner, and a layer of hoop and/or helically oriented fibers wound over the axial fibers.

14. The composite riser as in claim 13, wherein said outer surface of said tubular metal end comprises a first outer surface portion, a second outer surface portion and a third outer surface portion, said first outer surface portion, said second outer surface portion and said third outer surface portion defining said at least one external groove, said second outer surface portion being arranged between said first outer surface portion and said third outer surface portion, wherein said composite hoop structure engages said first outer surface portion and only a portion of said second outer surface portion, said first fiber structure engaging a remaining portion of said second outer surface portion and at least a portion of said third outer surface portion.

15. The composite riser as in claim 14, wherein said outer surface of said tubular metal end comprises a fourth outer surface portion and a fifth outer surface portion, said fourth outer surface portion being arranged adjacent to said first outer surface portion, said fifth outer surface portion being located adjacent to said third outer surface portion, said first fiber structure engaging said fourth outer surface portion.

16. The composite riser as in claim 15, wherein said fourth outer surface portion and said fifth outer surface portion are planar surfaces.

17. The composite riser as in claim 13, wherein said outer surface of said tubular metal end comprises a bearing surface and a base surface, said base surface comprising a medial side and a distal side, the composite hoop structure being in direct contact with the bearing surface and said medial side of the base surface, wherein said distal side of the base surface is uncovered by the composite hoop structure, said first fiber structure engaging said composite hoop structure and at least said distal side of the base surface.

18. The composite riser as in claim 14, wherein said layers of axial fibers extend along at least a portion of said third outer surface portion substantially parallel with said third outer surface portion.

* * * * *